United States Patent

Stier

Patent Number: 6,056,263
Date of Patent: May 2, 2000

[54] VALVE WITH CONSTRICTIONS TO ADJUST STROKE LENGTH

[75] Inventor: Hubert Stier, Schwieberdingen, Germany

[73] Assignee: Robert Bosch GmbH, Stuttgart, Germany

[21] Appl. No.: 09/068,721

[22] PCT Filed: Aug. 26, 1997

[86] PCT No.: PCT/DE97/01912

§ 371 Date: May 18, 1998

§ 102(e) Date: May 18, 1998

[87] PCT Pub. No.: WO98/14701

PCT Pub. Date: Apr. 9, 1998

[30] Foreign Application Priority Data

Oct. 2, 1996 [DE] Germany .......................... 196 40 782

[51] Int. Cl.$^7$ ............................. F02M 51/08; F16K 31/10
[52] U.S. Cl. ................ 251/129.18; 251/285; 29/890.121
[58] Field of Search ............................. 251/129.18, 284, 251/285; 29/890.121, 890.132

[56] References Cited

U.S. PATENT DOCUMENTS 3,608,171  9/1971  Stradtmann .................... 29/890.129
5,158,236  10/1992  Sugiyama et al. ............. 251/129.15

*Primary Examiner*—Gregory L. Huson
*Assistant Examiner*—Eric Keasel
*Attorney, Agent, or Firm*—Ronald E. Greigg; Edwin E. Greigg

[57] ABSTRACT

A fuel injection valve for internal combustion engines in which the adjustment of the valve needle stroke is carried out through a deformation of a valve seat carrier. The adjustment of the valve needle stroke is carried out through a plastic deformation in the form of a constriction on the circumference of the seat carrier. The valve and the process for manufacturing the valve are particularly suited for fuel injection valves of fuel injection systems for mixture compressing internal combustion engines with externally supplied ignition.

14 Claims, 2 Drawing Sheets

VALVE WITH CONSTRICTIONS TO ADJUST STROKE LENGTH

PRIOR ART

The invention is based on a valve and a process for manufacturing a valve A valve and a process for manufacturing a valve have already been disclosed (EP 0 497 931 B1), in which in order to adjust the valve needle stroke, the hollow body is deformed between two welds, which can lead to a damage of the welds and to deformations on the valve seat body.

ADVANTAGES OF THE INVENTION

The valve according to the invention, and the process for manufacturing the valve, have the advantage over the prior art that the stroke of the valve needle can be easily adjusted without the danger of an unwanted exertion of force on the valve seat body.

Advantageous improvements and updates of the valve and of the process are possible by means of the measures taken herein.

It is particularly advantageous to embody the at least one constriction on the seat carrier so it is formed running completely around 360° of the seat carrier circumference so that a uniform deformation of the seat carrier is produced. It is also advantageous to provide the constriction with an arcing contour, which produces a uniform stress progression.

It is likewise advantageous to select the ratio of diameter to wall thickness of the tubular seat carrier so that through the formation of the at least one constriction, the seat carrier is either shortened or lengthened in the axial direction along the valve longitudinal axis.

BRIEF DESCRIPTION OF THE DRAWINGS

Exemplary embodiments of the invention are represented in simplified form in the drawings and will be explained in more detail in the description that follows.

DESCRIPTION OF THE EXEMPLARY EMBODIMENTS

Figure 1:
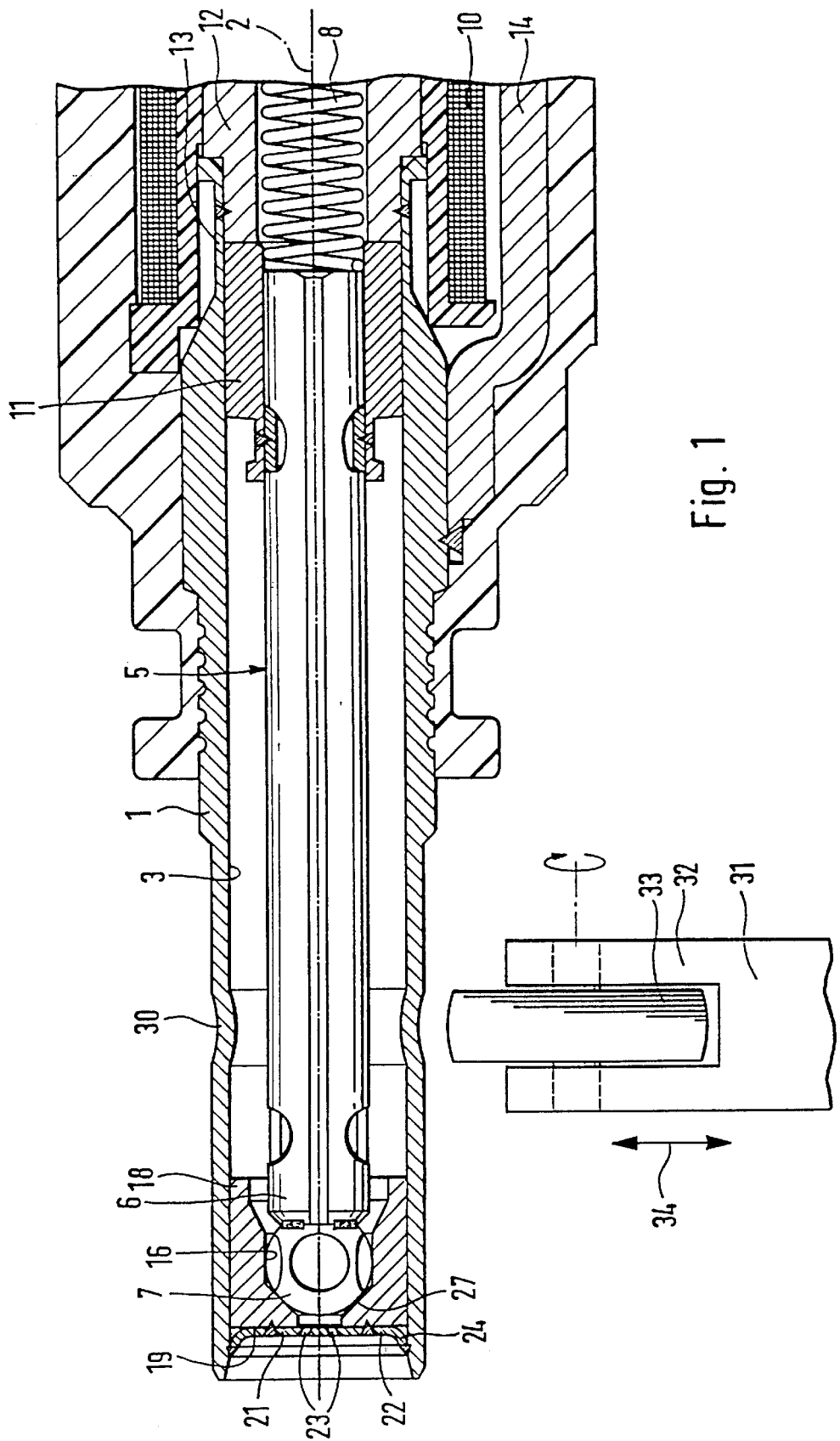
FIG. 1 is a partial representation of a first exemplary embodiment of a valve embodied according to the invention.

By way of an example for a valve, FIG. 1 represents a fuel injection valve for fuel injection systems of mixture compressing internal combustion engines with externally supplied ignition, which valve is embodied according to the invention as a first exemplary embodiment. To constitute a valve housing, the fuel injection valve has a tubular seat carrier 1, in which a longitudinal opening 3 is embodied concentric to a valve longitudinal axis 2. a tubular valve needle 5 is disposed in the longitudinal opening 3 and is connected to a ball-shaped valve closing body 7 on its downstream end 6. The actuation of the fuel injection valve is carried out in a known manner, for example electromagnetically. An electromagnetic circuit with a magnet coil 10, an armature 11, and a core 12 is used for axially moving the valve needle 5 and consequently for opening or closing the fuel injection valve counter to the spring force of a restoring spring 8. The armature 11 is connected to the end of the valve needle 5 remote from the valve closing body 7, e.g. by means of a weld, and is aligned toward the core 12. On its end oriented toward the core 12, the seat carrier 1 is provided with a connecting section 13 with a thinner wall thickness, into which the core 12 partially protrudes and with which the core 12 is connected in a sealed fashion, for example by means of a weld. The connecting section 13 represents a high magnetic resistance for the magnetic field lines so that the magnetic field lines run from the seat carrier 1, which is made of ferromagnetic material, past the connecting section 13, to the armature 11 and from this to the core 12, which is likewise made of ferromagnetic material. The magnetic circuit is closed, for example, by means of a bracket 14 made of ferromagnetic material, which encloses the magnet coil 10 from the outside in the axial direction, extends at least partially in the circumference direction, and is connected to the core 12 and the seat carrier 1.

A guide opening 16 of a valve seat body 18, which is slid into the longitudinal opening 3 of the seat carrier 1, serves to guide the valve closing body 7 during the axial movement. On its one end face 19 remote from the valve closing member 7, the valve seat body 18 is concentrically connected in a fixed manner to a bottom piece 21 of a hollow body 22 by means of a continuous, sealed weld. At least one injection opening 23, for example four injection openings 23, are formed into the bottom piece 21 of the hollow body 22 and when the valve is open, fuel is injected through these openings, for example into the air intake tube of the internal combustion engine. The hollow body 22 has a cup-shaped cross sectional shape, with a circumferential retaining stop 24 that adjoins the bottom piece 21, extends in the axial direction remote from the valve seat body 18, and is bowed conically outward, where it rests against the longitudinal opening 3 of the seat carrier 1 and is welded to the seat carrier 1 with a continuous, sealed weld.

The insertion depth of the valve seat body 18 into the longitudinal opening 3 of the seat carrier 1 determines the preset of the valve needle 5 stroke, since the one end position of the valve needle 5, when the magnet coil 10 is not excited, is determined by the contact of the valve closing body 7 against a valve seat face 27 of the valve seat body 18. The other end position of the valve needle 5, when the magnet coil 10 is excited, is determined, for example, by the contact of the armature 11 against the core 12. The axial path along the valve longitudinal axis 2 between these two end positions of the valve needle represents the stroke.

For the precise adjustment of the valve needle 5 stroke, the circumference of the seat carrier 1 is provided with at least one constriction 30 by means of a plastic deformation and this constriction extends radially from the circumference to the longitudinal opening 3. To this end, the static fuel quantity delivered during the static open state of the valve is measured in a known manner as an actual quantity. This actual quantity is compared in a computer with a predetermined reference quantity of the fuel to be injected and a reference stroke of the valve needle 5 is determined from this. In a different adjustment method, a path measuring device measures the real, actual stroke of the valve needle 5 and compares it in a computer to the predetermined reference stroke. Based on the computer-determined difference between the reference stroke and the actual stroke of the valve needle 5, a control signal is generated that is used to actuate a constricting tool 31. By means of an actuating device not shown, the constricting tool 31 is brought into a position in relation to the seat carrier 1 in such a way that it deforms the circumference of the seat carrier 1 plastically to form the constriction 30 toward the longitudinal opening 3 to the point that the length of the seat carrier in the axial direction along the valve longitudinal axis 2 and therefore the axial spacing between the valve seat face 27 and the core 12 changes so that the real stroke (actual stroke) of the valve needle 5 corresponds to the reference stroke. The constriction 30 can, for example, be produced by virtue of the fact that the constricting tool 31 has a roller body 33 that is supported so that it can rotate in a fork-shaped claw 32 and this roller body can be moved along the double arrow 34, approximately perpendicular to the valve longitudinal axis 2 toward or away from the seat carrier 1. In the exemplary embodiment, the roller body 33 has an arcing, circular circumference, with which it impresses an arcing, circular constriction 30 into the circumference of the seat carrier 1. To this end, the valve can be fixed in its position in a manner not shown and the constricting tool 31 is moved toward the seat carrier 1 in the direction of the double arrow 34 and encircles the seat carrier 1 to produce the at least one constriction 30. In the same manner, though, the constricting tool 31 can also be fixed and the valve is moved toward the constricting tool 31 by means of the signal sent by the computer and is set into a rotational movement. It is likewise possible that both the valve and the constriction tool 31 are moved toward each other and both are set in rotation. The contour of the constriction 30 can also have a shape other than the arcing, circular one, for example it can be triangular, rectangular, or the like. To this end, then, instead of an arcing contour, the roller body 33 is provided with a contour that is triangular, rectangular, or the like. The previously described shape of the constriction 30 is embodied on the circumference of the seat carrier 1, continuing over 360°. To change the axial length along the valve longitudinal axis 2 of the seat carrier 1 or the longitudinal opening 3, though, it is also possible to embody the constriction 30 so that it is not completely continuous over 360°, but to provide it as only distributed over the circumference in segments so that smaller, non-deformed regions of the wall of the seat carrier are disposed in the circumference direction between the individual segments of the constriction 30. In this manner, the constriction 30 can be comprised, for example, of three or more segments which are distributed evenly in relation to one another in the circumference direction. In addition, two and more constrictions 30 can also be provided, spaced axially apart from each other on the circumference of the seat carrier 1.

Figure 2:
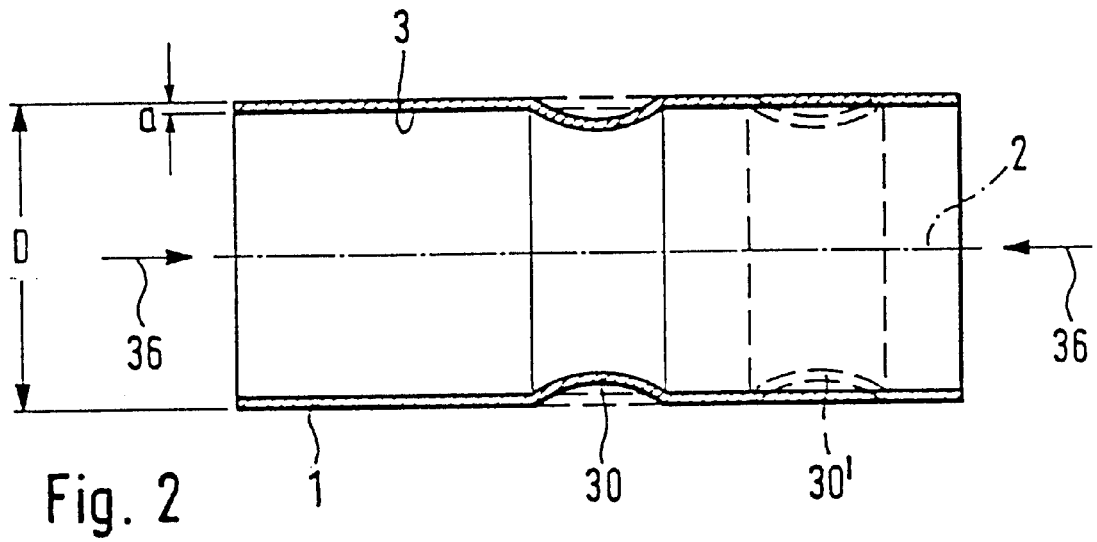
FIG. 2 is a partial representation of a seat carrier that corresponds to the first exemplary embodiment according to FIG. 1.
Figure 3:
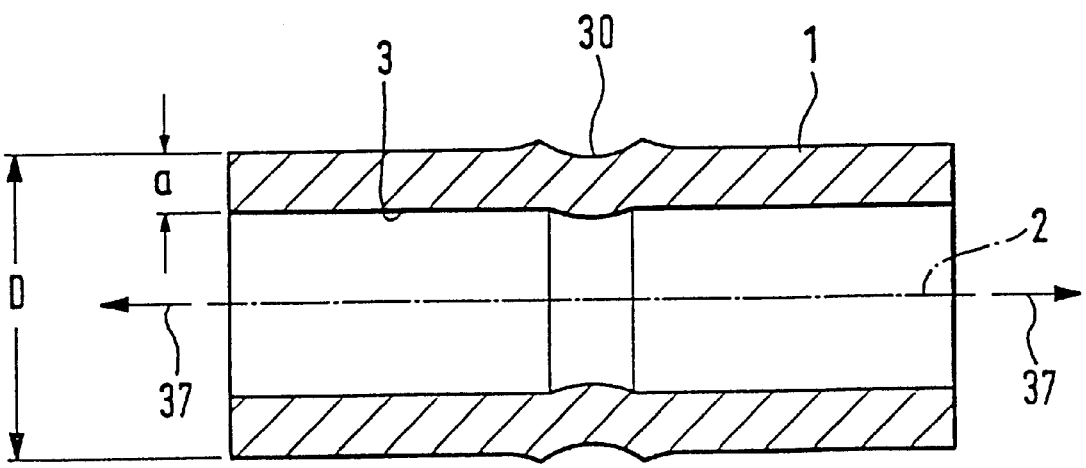
FIG. 3 is a partial representation of a seat carrier that corresponds to a second exemplary embodiment.

FIG. 2 is a partial representation of seat carrier which corresponds to the seat carrier 1 according to FIG. 1 and has a constriction 30, which is provided with a second constriction 30', shown with dashed lines, spaced axially apart from the first constriction carrier 1 is embodied so that the ratio of its diameter D to the wall thickness a of the tubular seat carrier 1 is great, then the length of the seat carrier 1 decreases in the axial direction along the valve longitudinal axis 2 in accordance with the arrows 36, by means of which the stroke of the valve needle 5 is reduced. If in contrast to this, the ratio of the outer diameter D of the seat carrier 1 to the wall thickness a of the seat carrier is chosen as small, then the manufacture of the constriction 30 produces an elongation of the seat carrier 1 or the longitudinal opening 3 along the valve longitudinal axis 2 in the direction of the arrows 37 and therefore an enlargement of the valve needle stroke. For example for a stainless steel (V2A), with a ratio of the outer diameter D of the seat carrier 1 to the wall thickness a of >25:1, for example, a shortening of the seat carrier 1 is produced that corresponds to the depiction in FIG. 2 and for a ratio of <25:1, an elongation of the seat carrier 1 is produced that corresponds to the depiction in FIG. 3.

The foregoing relates to preferred exemplary embodiments of the invention, it being understood that other variants and embodiments thereof are possible within the spirit and scope of the invention, the latter being defined by the appended claims.

I claim:

1. A fuel injection valve for internal combustion engines, comprising a magnet coil (10), a core (12), an armature (11) a movable valve needle connected with the armature, a valve seat body that is connected to a tubular seat carrier, said valve seat body has a valve seat face that cooperates with the valve needle, a longitudinal opening in the seat carrier that extends concentric to a valve longitudinal axis, into which, the valve needle and the armature protrude, at least one constriction (30, 30') is provided on a circumference of the seat carrier (1) at a section of the seat carrier (1) between the armature (11) and the valve seat body (18) and said constriction is constituted by means of a plastic deformation and extends radially toward the longitudinal opening (3) for changing a stroke of the movable valve needle.

2. A valve according to claim 1, in which the at least one constriction (30, 30') is circumferentially embodied on the seat carrier (1).

3. A valve according to claim 1, in which the at least one constriction (30, 30') has an arcing contour.

4. A valve according to claim 2, in which the at least one constriction (30, 30') has an arcing contour.

5. A valve according to claim 1, in which the at least one constriction (30, 30') has a rectangular contour.

6. A valve according to claim 2, in which the at least one constriction (30, 30') has a rectangular contour.

7. A valve according to claim 1, in which the at least one constriction (30, 30') has a triangular contour.

8. A valve according to claim 2, in which the at least one constriction (30, 30') has a triangular contour.

9. A process for changing a stroke of a movable valve needle of a fuel injection valve for internal combustion engines, which includes a magnet coil (10), a core (12), an armature (11), a movable valve needle connected with the armature (11) a valve seat body that is connected to a tubular seat carrier and has a valve seat face that cooperates with the valve needle, and a longitudinal opening in the seat carrier that extends concentric to a valve longitudinal axis, into which the valve needle and the armature (11) protrude and executes a stroke between a valve closed position and a valve open position, the method includes plastically deforming the circumferences of the seat carrier (1) at a section of the seat carrier (1) between the armature (11) and the valve seat body (18) in a radial direction toward a longitudinal opening (3) of the seat carrier in the form of at least one constriction (30, 30').

10. A process according to claim 9, in which the at least one constriction (30, 30') is circumferentially embodied on the seat carrier (1).

11. A process according to claim 9, which comprises selecting a ratio of an outer diameter (D) to the wall thickness (a) of the tubular seat carrier (1) so that the seat carrier (1) is shortened in an axial direction along the valve longitudinal axis (2) by means of the formation of the at least one constriction (30, 30').

12. A process according to claim 10, which comprises selecting a ratio of an outer diameter (D) to the wall thickness (a) of the tubular seat carrier (1) so that the seat carrier (1) is shortened in the axial direction along the valve longitudinal axis (2) by means of the formation of the at least one constriction (30, 30').

13. A process for changing a stroke of a movable valve needle of a fuel injection valve for internal combustion engines, which includes a magnet coil (10), a core (12), an armature (11), a movable valve needle connected with the armature (11), a valve seat body that is connected to a tubular seat carrier and has a valve seat face that cooperates with the valve needle, and a longitudinal opening in the seat carrier that extends concentric to a valve longitudinal axis, into which the valve needle and the armature (11) protrudes and executes a stroke between a valve closed position and a valve open position, the method includes plastically deforming the circumference of the seat carrier (1) at a section of the seat carrier (1) between the armature (11) and the valve seat body (18) in a radial direction toward a longitudinal opening (3) of the seat carrier in the form of at least one constriction (30, 30'), selecting a ratio of an outer diameter (D) to the wall thickness (a) of the tubular seat carrier (1) so that the seat carrier (1) is lengthened in an axial direction along the valve longitudinal axis (2) by means of the formation of the at least one constriction (30, 30').

14. A process according to claim 13, in which the at least one constriction (30, 30') is circumferentially embodied on the seat carrier (1).

* * * * *